United States Patent [19]

Haile

[11] Patent Number: 4,918,772
[45] Date of Patent: Apr. 24, 1990

[54] FOLDING SLEEPER SHELL

[76] Inventor: Hudson C. Haile, 1881 Fosse Way, Titusville, Fla. 32796

[21] Appl. No.: 241,908

[22] Filed: Sep. 7, 1988

[51] Int. Cl.$^5$ ............................................. B60R 15/00
[52] U.S. Cl. ...................................... 5/119; 296/169; 296/174
[58] Field of Search ........................... 5/118, 119, 136; 296/163, 169, 170, 174

[56] References Cited

U.S. PATENT DOCUMENTS

| | | | |
|---|---|---|---|
| 1,320,794 | 11/1919 | Palmer | 296/169 |
| 1,431,783 | 10/1922 | Diefenderfer | 296/174 |
| 2,782,068 | 2/1957 | Esche | 5/118 X |
| 3,083,047 | 3/1963 | Babbel | 296/174 |
| 3,402,960 | 9/1968 | Erke | 296/174 |

FOREIGN PATENT DOCUMENTS

735337  5/1966  Canada ............................... 296/169

*Primary Examiner*—Michael F. Trettel
*Attorney, Agent, or Firm*—James H. Beusse

[57] ABSTRACT

A sleeping facility of greatly improved operational simplicity and esthetically pleasing design for attachment to or incorporation in the side of a pickup truck topper, van, motor home or mobile home, which takes up no internal space in the vehicle, yet provides a comfortable bed protected from the elements which can be quickly and effortlessly deployed for use or stowed for travel in a matter of seconds and requires no power source for operation. The sleeper shell leaves all internal vehicle space unobstructed and obviates the necessity of unloading cargo in order to provide sleeping space. The top 22 and bottom 24, which contains the bed 26, fold into a vertical latched position parallel to each other for travel. Deployment is of extreme simplicity and consists of raising the top 22 with the help of pneumatic spring cylinders 40, dropping the bottom 24 with the bed 26 to the horizontal position and fixing that position with folding supports 38 and 39. The top 22 tensions the front, side, and rear fabric panels 28, 30 and 32 connecting the top 22 and bottom 24 through the force exerted by the pneumatic spring cylinders 40 on the top 22.

2 Claims, 9 Drawing Sheets

FOLDING SLEEPER SHELL

FIELD OF THE INVENTION

This invention relates to camper shells such as used on pickup trucks, specifically to a folding sleeper bed assembly that can be incorporated in the side of a pickup truck topper shell, the side of a van, or the side of a motor or mobile home. Although the van and motor home can accomodate this invention, it is primarily directed at pickup trucks with toppers which have become so popular for young couples, families needing a second utility/recreation vehicle, and hunters and other sportsman.

DISCUSSION OF PRIOR ART

Heretofore, the problem of providing sufficient sleeping space for hunters and travellers who prefer pickup trucks was resolved by (1) taking along a tent and cots, air mattress, or other sleeping pad; (2) sleeping in the bed of the truck on mattresses squeezed between the protruding fenders; or (3) using a tent-like addition that attaches to the pickup truck.

In case (1) the camper carries his tent and sleeping paraphenalia in the back of his truck. It occupies a space, depending on the size of the tent and type of bed, of anywhere from one to six cubic feet. For accomodations he carefully selects a campsite, clears it of rocks, branches, and other debris, and then sets up tent and sleeping bed. If he is a wise camper he allows about one hour of daylight to set up his camp. In the morning the process is reversed and likewise takes about one hour of daylight. If it is raining the camper has an unpleasant task of setting up camp and/or taking it down and packing away a much heavier and wet tent, which compounds his next setup, even if the weather is then dry. Assuming the camper were driving a pickup truck with a topper and chose to sleep in his truck rather than the tent because of the weather, he would then have to make a bed in cramped quarters. If he had a fried or wife along the accomodations would be doubly cramped.

In case (2), assuming the same couple travelling in a topper-equipped truck, the campers would have to remove all of the cargo, lay out their mattresses between the fenders, and somehow try to get comfortable in a space four or five feet wide. In the morning they would have to roll up the bedding and reload their cargo.

In case (3) the tent addition has basically the same disadvantages as a regular tent, except that the former may be quicker to set up.

Often sportsmen and other travellers pull a boat behind their pickup trucks. If they are camping "on the road" while enroute to their destination, then setting up sleeping accomodations becomes even more difficult because of having to unload tent or other cargo over the trailer hitch.

OBJECTS AND ADVANTAGES

Accordingly several objects and advantages of my invention are: to provide a quick, foldout, comfortable sleeping bed that is stored in the side of a topper shell, van, or motor home which can be deployed or folded and stored in seconds, even in the dark; to provide a bed in each side of the pickup topper that is open and accessible from the inside of the topper, that takes up no room from the inside of the topper nor requires unloading of significant cargo, that requires no camp site, that is high and dry and well ventilated, and that provides comfortable full length sleeping without elbowing ones companion; and to provide sleeping accomodations that once stored in no way restrict the normal usable cargo space of the vehicle.

In addition I claim the additional objects and advantages: to provide sleeping accomodations that can also be used for seating such as at a table set up between the beds where space has been freed up, that does not restrict cargo space when stored, that provides safety padding in the side walls in the stored position for rear occupants, that can accommodate side windows for light or viewing, that if tent portion is stored wet allows good drainage and drying while underway by virtue of hanging vertically, that if stored wet, bedding does not get wet because tent portion is between top and bottom hard surfaces of foldout shell; and to provide a convenient sleeper shell that can be set up almost anywhere the truck, van, or motor home can park, that levels in one direction, that is of such extreme simplicity that it can be easily managed by persons not accustomed to rigorous camping, that by virtue of being outboard of the topper shell when deployed allows room for a third traveller to sleep comfortably in the bottom of the pickup truck bed between the fenders, that does not interfere with boat or trailer towing; that greatly increases the mobility of hunters, vacationers, campers, and others and reduces their enroute time, and that provides an additional approximately 100 cubic feet of camper space without any significant additional size or mileage penalty on the road.

Readers will find further objects and advantages of the invention from a consideration of the ensuing description and accompanying drawings.

DESCRIPTION OF DRAWINGS

Drawing Figures

LIST OF REFERENCE NUMERALS 20 frame 22 top
24 bottom
26 foam pad
28 front panel
30 side panel
32 rear panel
34 hinge
36 window
38 upper support member
39 lower support member
40 spring cylinder
42 screen
44 latch
46 water seal
48 side of topper
50 side of van
52 side of motor home
54 removable panel supporting pad 58
56 sliding lock for support members 38 and 39
58 removable foam pad section
60 snaps
62 frame for holding removable section
64 typical pickup truck box
66 pickup truck topper
67 welded pin

DESCRIPTION OF INVENTION

Figure 1:
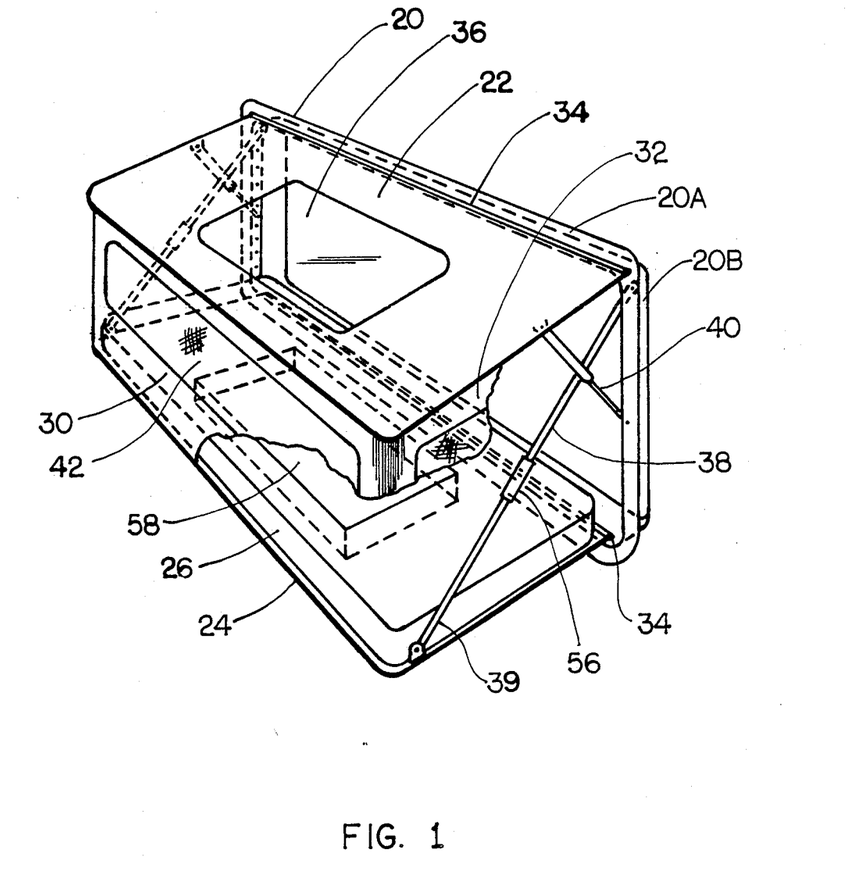
FIG. 1 shows a perspective view of a sleeper shell as a separate unit for mounting in the side of a van, motor home, or mobile home.

FIG. 1 shows the deployed folding sleeper shell according to the preferred embodiment of my invention. The preferred embodiment of my invention is that of molded fiberglass, plastic, or composite, either of which can provide the necessary strength-versus-weight ratio and beauty of design. The shell is composed of a main frame 20 to which top 22 and bottom 24 members are attached and which serves as the attaching member for fastening the assembly to the side of a topper, van, or motor or mobile home. The frame 20 is a supporting member with a thickness ranging from 1/8 inch of metal of 1/4 inch if fiberglass, an overall length from 6 feet to 8 feet and an overall width from 3 feet to 4 feet, the length-by-width dimensions depending on the size of the base vehicle, element desire of the buyer, and manufacturing considerations. The length and wisth of the overall opening for access to the bed would be 2 to 4 inches smaller depending on the width of the flange around the frame 20. The frame 20 is formed with a right angular shaped (or L-shaped) cross-section having right angular extending legs. One leg 20A extends into an opening in the side of the topper, van, or other vehicle while the other leg 20B acts as a flange extending outwardly of the opening along the vehicle side so that fasteners fastening means may be inserted through the leg 20B for attaching the frame 20 to the vehicle side.

Attached to the top inside edge of the frame 20 by means of a full length extruded aluminum hinge 34 of the type commonly used on pickup truck toppers is the top 22 which serves as the roof, and which incorporates a window 36 of either flat or bubble design. The slope of the top 22 depends on the levelling of the bed 26, but in any case is sufficient to shed rain water. The top 22 is held at the angled position by means of two pneumatic spring loaded cylinders 40 such as Powerise Pneu-Springs; Powerise Pneu-Spring is a trademark of Eberhard Manufacturing Co., Cleveland, Ohio. One cylinder 40 is mounted at each end of the top 20 and the two combined have sufficient force to carry the weight of the top 20 and provide sufficient tension for tautness in the front panel 28, side panel 30, and rear panel 32, all of which are constructed to tent fabric. On the outboard edge of the top 20 are two latching mechanisms 44.

Figure 2:
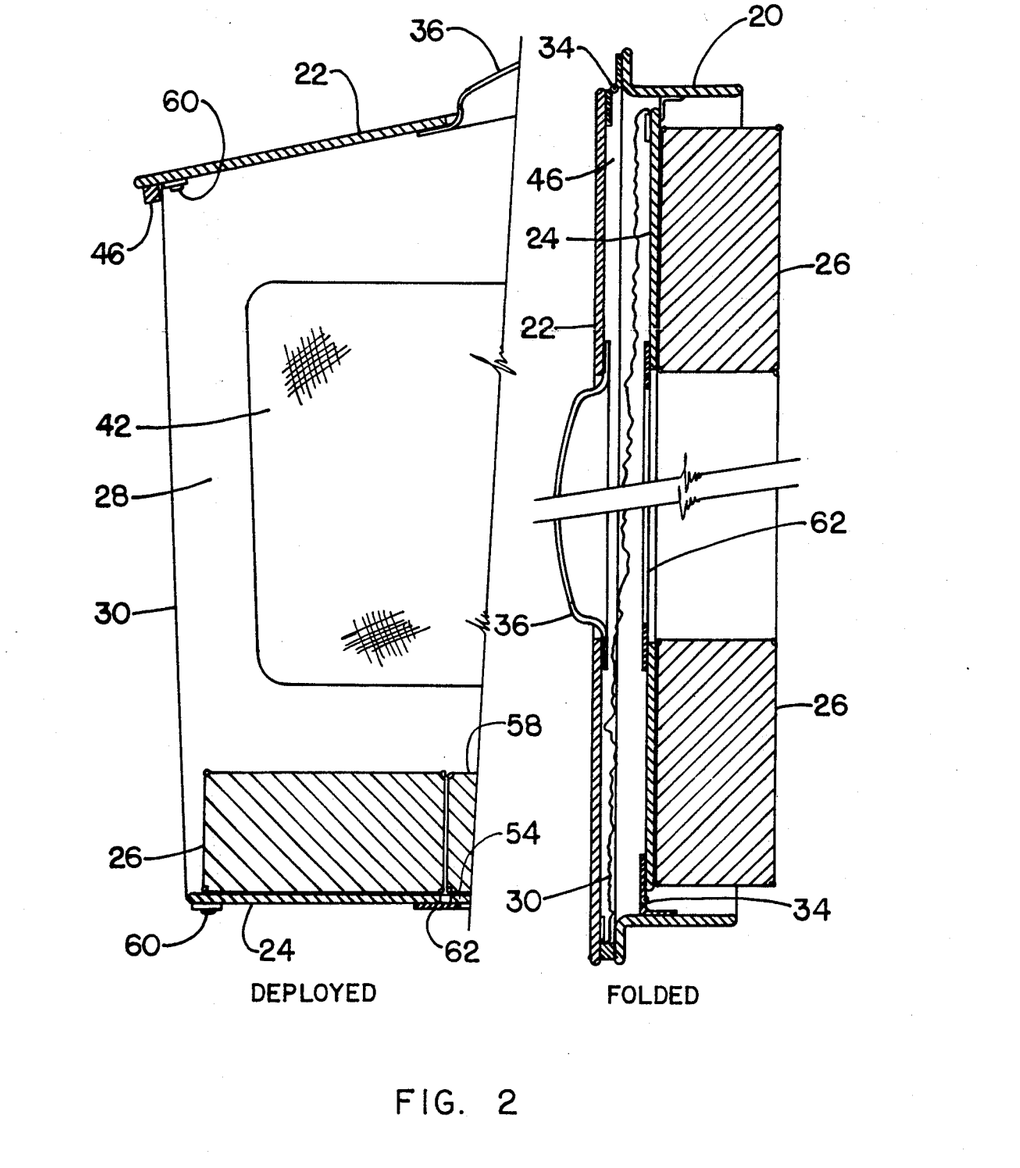
FIG. 2 shows a cross section through folding sleeper shell unit for installation in a flat surface with frame fabricated of either fiberglass, plastic, or composite material and incorporating a bubble plexiglass window.

Fastened underneath the top 20 approximately 2 inches from the outside edges by means of snaps 60 or other fastener as shown in FIG. 2 is the top edge of the front, side, and rear panels 28, 30 and 32. Panels 28, 30 and 32 have zippered sections which when zipped open expose openings covered by nylon screen 42. The bottom edges of panels 28, 30 and 32 are attached to the bottom 24 by means of snaps 60 located on the underside of the bottom 24 approximately 2 inches from the edge. The vertical inside edges of the fabric panels 28 and 32 are fastened to the inside of the frame likewise by snaps 60. The configuration of the fabric panels 28, 30 and 32 is such that the whole fabric assembly can be removed and washed or stored.

Figure 3:
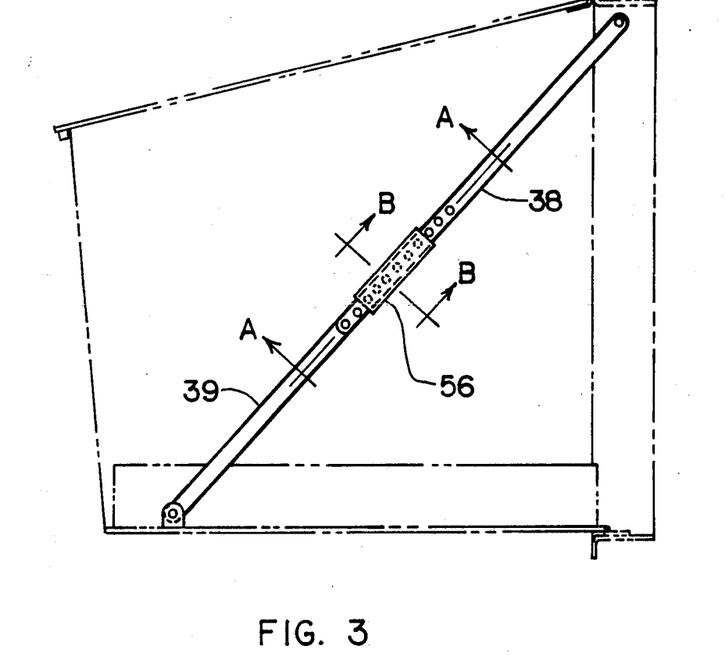
FIG. 3 shows details of the adjustable bar assembly for holding sleeper shell in expanded configuration.
Figure 4:
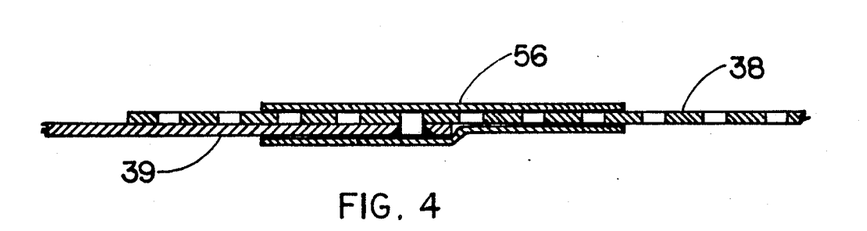
FIG. 4 shows Section A—A with sliding metal sleeve lock holding pinned connection in place and rigid.
Figure 5:
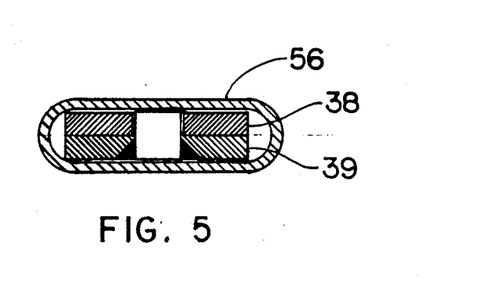
FIG. 5 shows Section B—B with metal sleeve around pinned members.

The fiberglass bottom 24 of the folded sleeper shell is fastened to the bottom inside edge of the frame 20 also by means of a full length aluminum hinge 34. The bottom 24 is held in place and level by means of an adjustable length, flat bar assembly 38 & 39 at each end of the bottom 24 which is hingedly pinned at each end of the support assembly 38, 39, 56 & 67, and which disconnects in the middle for stowage as shown in FIGS. 3, 4 and 5. Welded to the lower flat bar support 39 is a pin 67 as shown in FIGS. 4 & 5 which engages the upper flat bar support 38 in any one of a number of holes which allow adjustment of the overall length of the flat bar assembly 38 & 39. To hold the upper and lower flat bar support members 38 & 39 located together at the pinned connection and in a rigid configuration, a shaped tubular sliding lock 56 is slipped down over the connection. The total support assembly 38, 39, 56 & 57 then becomes a rigid member which will support loads in either tension or compression. In the center of the bottom 24, as shown in FIGS. 1 and 2, there is a removable fiberglass panel 54 the same size as the window 36 and located such that when folded in the travel position the opening in the bottom 24 is directly opposite the window 36 in the top 20. When deployed the removable panel 54 is not fastened to the bottom 24, but merely rests in a recess such that its top surface is flush with the top surface of bottom 24.

The bed is comprised of a fabric covered, 4 inch thick foam pad which has approximately the same overall dimensions as the bottom 24. An opening in the middle of the pad 26 matches the location of the removable panel 54 in the bottom 24. The pad section 58 removable from the pad 26 is also fabric covered and fastened to its removable panel 54 by snaps 60. Similarly the foam pad 26 is securely fastened to the bottom 24 by snaps 60 around the edge such that it cannot move when the sleeper shell is folded in the travel configuration.

My invention includes any embodiment which incorporates other materials, or its use in other types of vehicles such as a plain cargo van. It is herein described primarily as an add-on, after market product for installation by the purchaser.

OPERATION OF INVENTION

In the stowed, travel configuration the top 22 and bottom 24 are folded to a vertical position with the top 22 serving as the outside sealing panel as shown in FIG. 2. The top 22 folds against a weather seal 46 or has an edge designed so as to exclude rain water. The top is latched down securely at the bottom edge in travel position by two latches 44.

Figure 8:
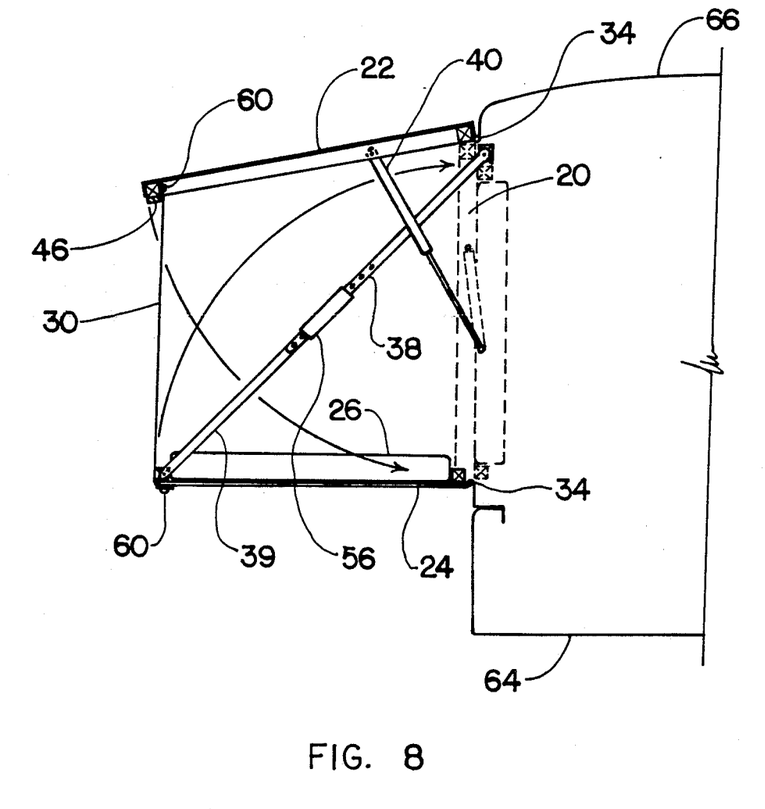
FIG. 8 shows an end view of a sleeper shell incorporated in pickup truck topper.

For deployment of the foldout sleeper shell the traveller parks his vehicle which incorporates this invention such that the vehicle is reasonably level front to back. This can usually be accomplished by parking 90 degrees to the slope of any inclination. The user then releases the latches 44 and lifts the top 22 of the sleeper shell. Once the motion commences, which motion consists of a rotation of the top 22 about its top edge hinge 34 from a vertical toward a horizontal position as shown in FIG. 8, the pneumatic spring cylinders take over and continue the lift. Once the top 22 is up the user reaches in and pulls the bottom 24 or bed portion down to a level position such that the fabric panels 28, 30 and 32 connecting the top 22 and bottom 24 are stretched tight. Following this step the supports 38 and 39 on each end are adjusted to the proper length to maintain the bed in a level position, attached to each other with the welded pin 67 connection as shown in FIG. 4, and the connection is made fast by means of the sleeved shaped, sliding lock 56 which slides down over the support member joint and prevents it from disengaging or folding. This allows the support to be used either in tension or compression. If the bed is still not level the traveller uses a bubble level and either lowers or raises the outside edge of the bottom 24 until the bed is level, at which point he again pins the adjustable length supports 38 and 39 at the proper length which then provides firm support at each end of the bed. During the levelling process the top adjusts automatically through the action of the pneumatic spring cylinders which maintain enough force against the top 22 to keep the front, side and rear fabric panels 28, 30 and 32 taut.

Once the top 22 and bottom 24 are deployed the traveller enters the vehicle and places the removable pad section 58 into the opening in the bed for the window thus making the bed complete. Once the above process is completed, the process is repeated for the other foldout sleeper shell if the traveller's vehicle has one on each side and he desires to use the additional sleeper shell.

In order to stow the sleeper shell the traveller removes the window opening bed panel 58, slides the sliding lock 56 up and releases the supports 38 and 39 at each end of the bed (bottom) 24, folds the bottom 24 into the vertical position, pulls the top 22 down, and secures it in place with the latches 44.

Thus the reader can see that the folding sleeper shell of this invention provides a traveller with a sleeping space that can be easily and quickly deployed anywhere by persons of almost any age and capability.

Figure 6:
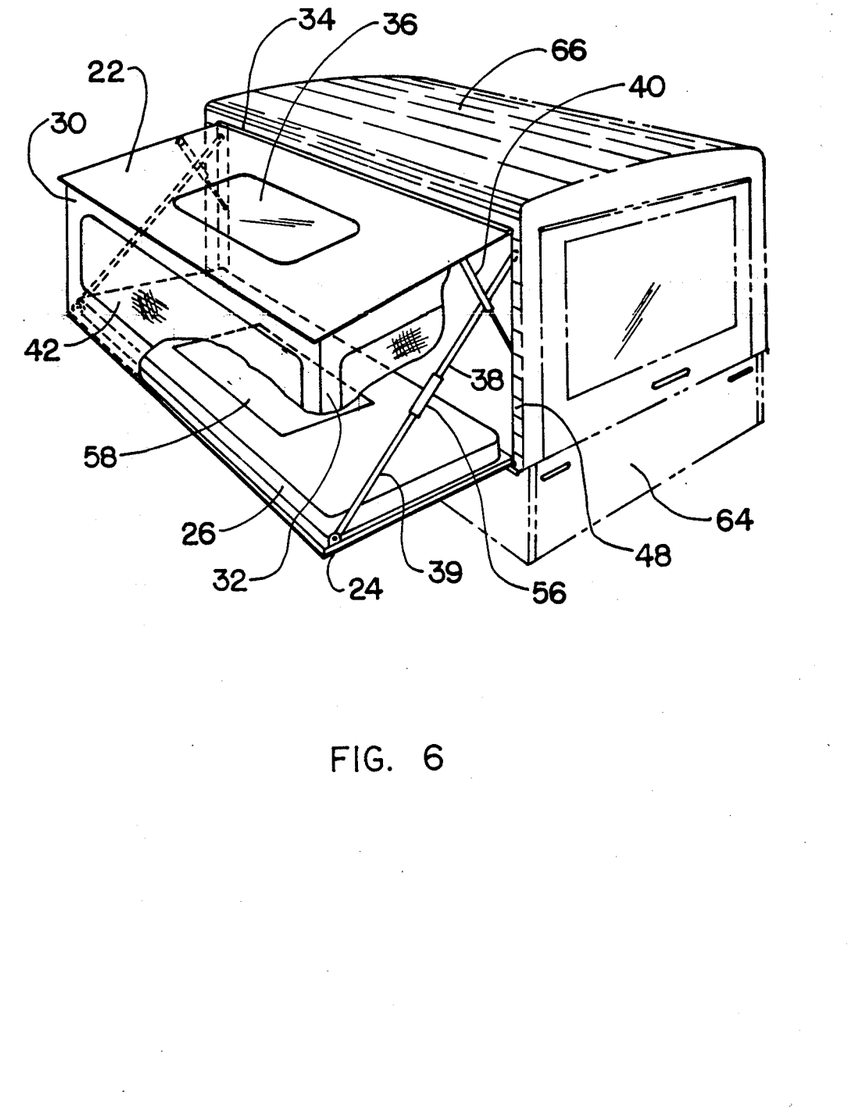
FIG. 6 shows a perspective view of an extened sleeper shell incorporated in a topper for a pickup truck.
Figure 7:
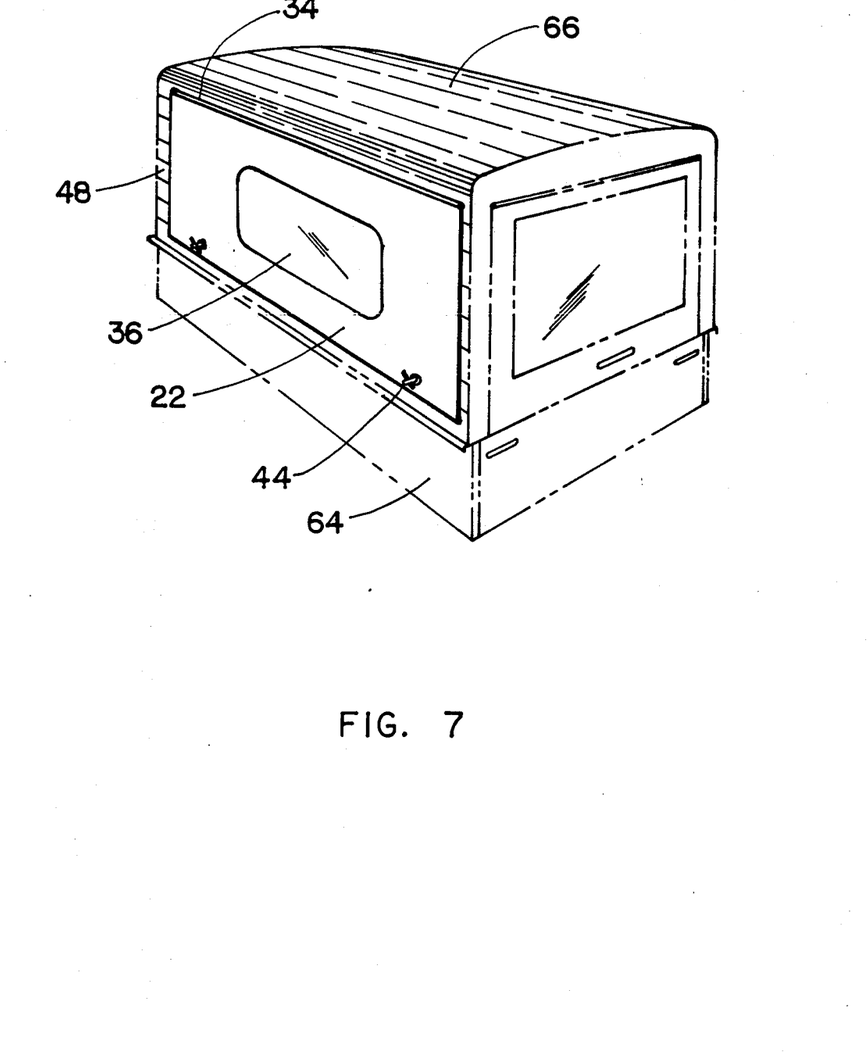
FIG. 7 shows a perspective view of the sleeper shell folded into the side of the pickup truck topper.
Figure 9:
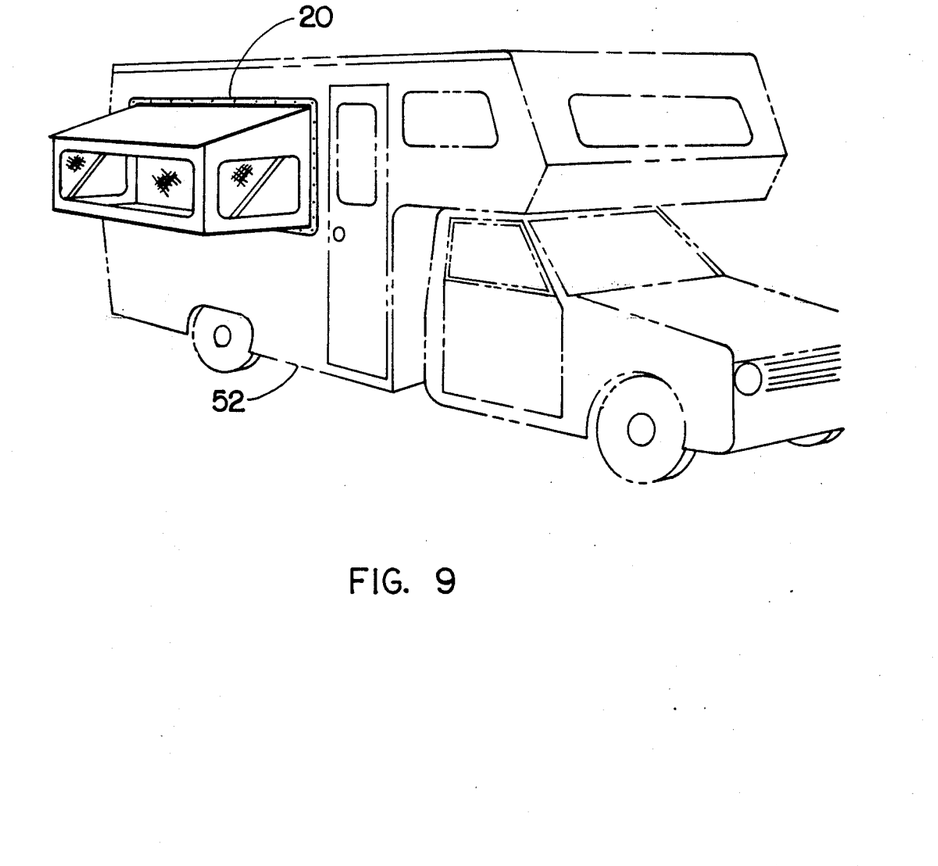
FIG. 9 shows sleeper shell incorporated in the side of a motor home.
Figure 10:
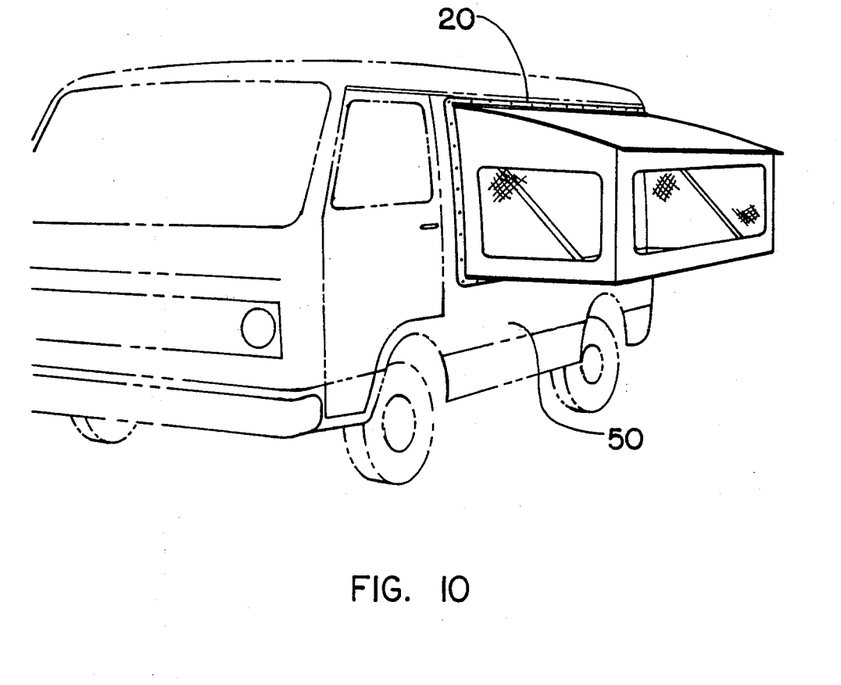
FIG. 10 shows sleeper shell incorporated in the side of a van.
Figure 11:
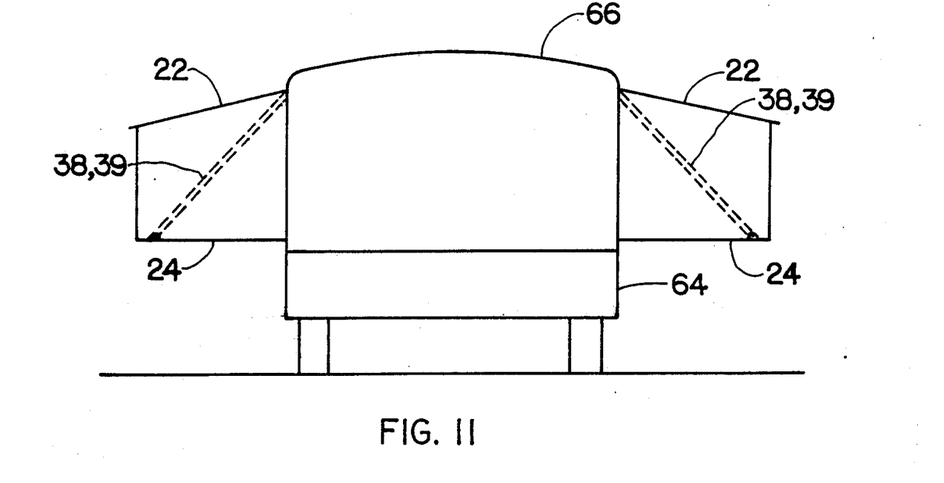
FIG. 11 shows position of sleeper beds when vehicle is parked on level ground.
Figure 12:
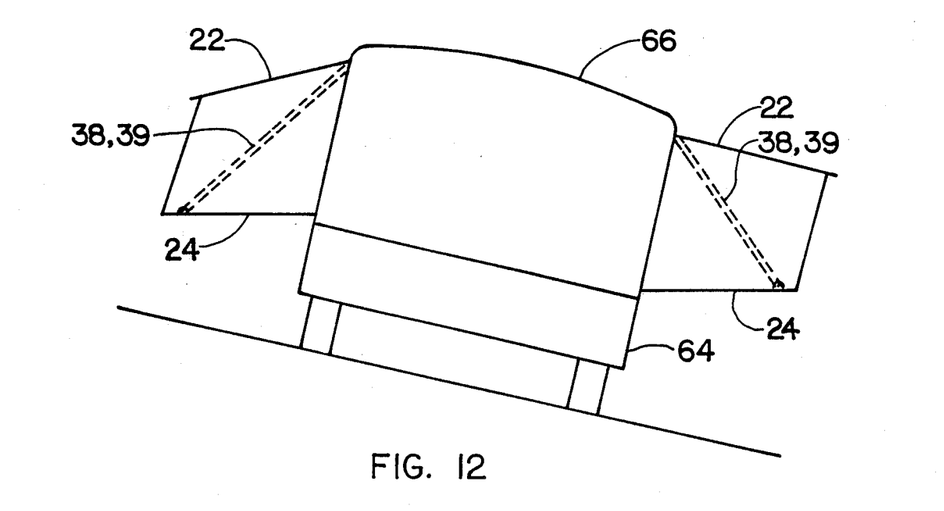
FIG. 12 shows position of sleeper beds when vehicle is parked on an incline.

While my above description contains many specificities, these should not be construed as limitations on the scope of the invention, but rather as an exemplification of one preferred embodiment thereof. For example, of the various embodiments, i.e. integral with a pickup topper as shown in FIG. 6, or attached to a topper, a van, or a motor or mobile home as shown in FIG. 9, the basic operation can be the same. The basic operation can also be similar whether constructed of wood, sheet metal, fiberglass, plastic, or composite, and whether of rectangular, trapezoidal, or other geometric shape. Likewise, the two main hard panels (top and bottom), 22 and 24, can fold together in various configurations, all of which accomplish the same end. Accordingly, the scope of the invention should be determined not by the embodiments illustrated, but by the appended claims and their legal equivalents.

I claim:

1. A folding sleeping assembly for humans including a rectangular rigid frame, a rigid rectangular bed member, a rigid rectangular roof member, and having three rectangular flexible side walls of water resistant fabric, the assembly being suitable for mounting in the side of a vehicle element such as a pickup truck topper, van body, or mobile or motor home such that when installed the short dimension of said frame is approximately vertical, with said sleeping assembly comprising:

said rectangular rigid frame having an open area bordered by edges having a flanged cross section, said edges including relatively long top and bottom edges and relatively short side edges said roof member being rotatably hinged on one long edge to the long top edge of said frame, said rigid bed member being rotatably hinged on one long edge to the bottom edge of said frame, said side walls being formed by a substantially rectangular flexible water resistant fabric panel having one long edge attached to a periphery of said roof member except for said long edge of said roof member hinged to said frame, and another long edge of said water resistant fabric panel attached to said bed member's periphery except for said one long edge of said bed member hinged to said frame, such that when said bed member is rotated upward about its hinged attachment to a vertical folded position against said frame, and said roof member is rotated downward about its hinged attachment to a vertical folded position, said sleeping assembly comprises a compact flat assembly in a stored configuration and, when said roof member is rotated outward and upward approximately 90 degrees about its hinged attachment, and when said bed member is rotated outward and downward approximately 90 degrees about its hinged attachment, said flexible water resistant fabric panel is stretched between the members as to comprise three side walls of said sleeping assembly with a fourth side of said sleeping assembly open to the interior of a vehicle element to which said frame is attached, such that said sleeping assembly forms a deployed assembly in a use configuration and when said sleeping assembly is deployed by rotating said roof member upwardly and said bed member downwardly the roof member rotations is assisted by an independent pneumatic spring loaded cylinder at each end of said slipping assembly hingedly connected at each end of said cylinder between said frame and said roof member such that the weight of said roof member is carried by said cylinders so as to minimize the effort of deployment, said bed member is counter-balanced by said cylinders through said side walls as to keep said flexible fabric taut, said cylinders facilitate rotation of the deployed sleeping assembly so that the bed member can be made level, and when deployed, said bed member is fixed in the desired position by diagonal adjustable length bar assemblies located at each end of said sleeping assembly and which are suitable for loading either in tension or compression and which each said bar assembly is hingedly attached at each end between said frame and outer corners of said bed member and comprise a tension loaded element when said bed is carrying the load of one or more humans, and a compression element when said bed member is unloaded and said pneumatic spring loaded cylinders are attempting to lift said roof member and consequently lift said bed member through the attached side wall of said assembly, and which each said adjustable bar assembly is comprised of two long flat metal pieces with means for selectively connecting the metal pieces together at spaced locations forming a connection to provide overall length adjustment, and which said adjustable bar assembly connection is held in place by a metal tubular lock which slides down over said connection and is of sufficient length to hold said connection and said bar assembly in a rigid configuration.

2. The sleeping facility of claim 1 wherein the flanged cross section of said rigid frame is a right angular shape such that one leg of the angular shape protrudes into the side of said vehicle element into which said sleeping assembly is installed and the other leg of the angular shape serves as a flange surrounding said frame for use in attaching said sleeping assembly to the side of said vehicle element.

* * * * *